Dec. 12, 1944.     T. H. RYAN     2,364,919
TRANSMISSION MECHANISM
Filed July 20, 1942     7 Sheets-Sheet 1
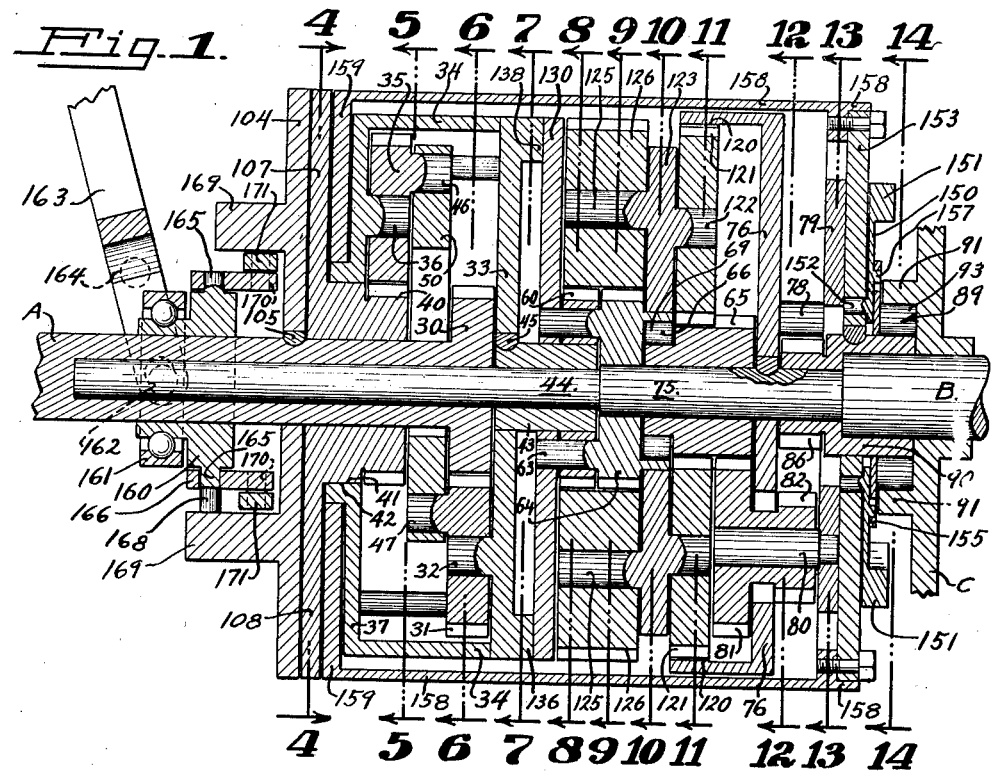
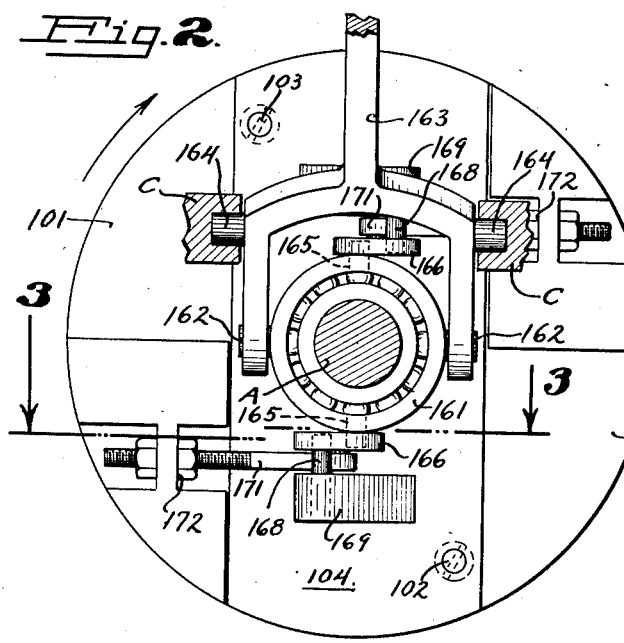
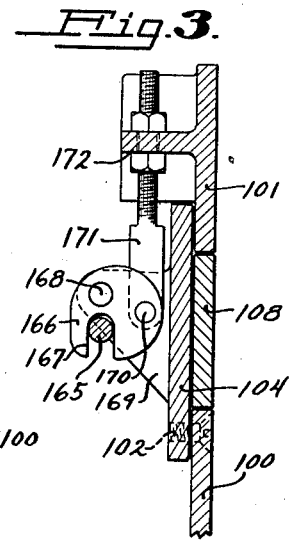
INVENTOR,
THOMAS H. RYAN.
BY
*Chas. E. Townsend*
ATTORNEY.

Dec. 12, 1944.   T. H. RYAN   2,364,919
TRANSMISSION MECHANISM
Filed July 20, 1942   7 Sheets-Sheet 2

INVENTOR,
THOMAS H. RYAN.
BY
*Chas. E. Townsend*
ATTORNEY.

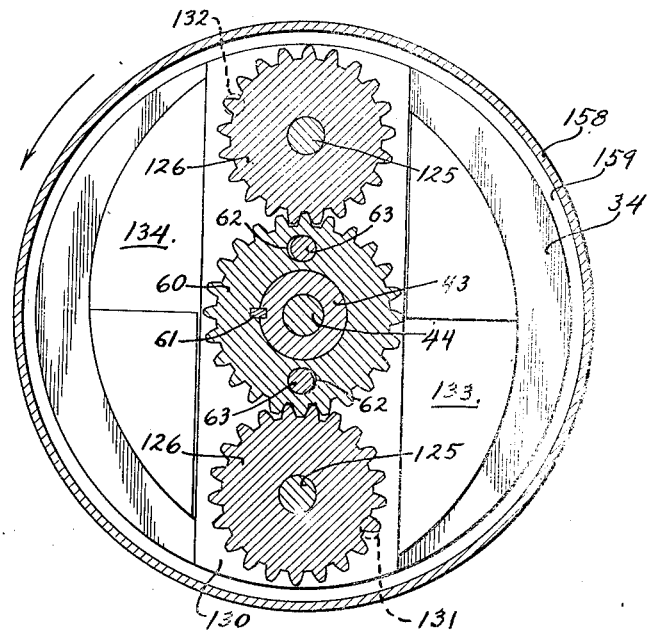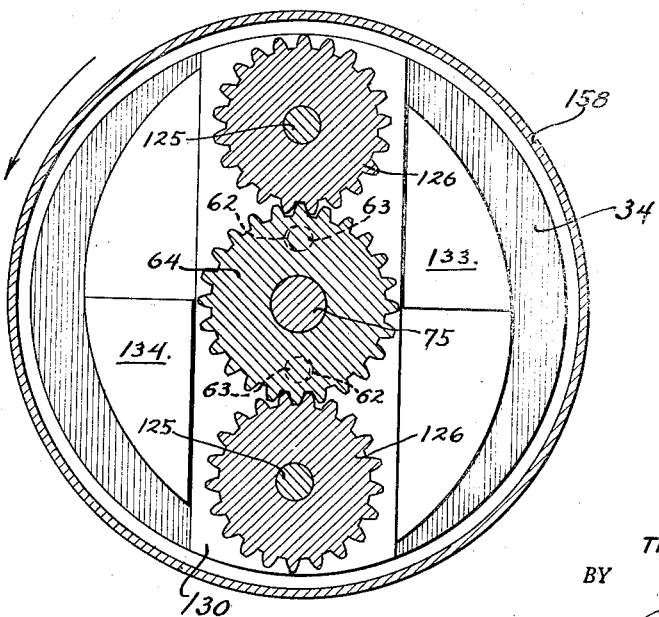

Dec. 12, 1944.      T. H. RYAN      2,364,919
TRANSMISSION MECHANISM
Filed July 20, 1942      7 Sheets-Sheet 5

INVENTOR,
THOMAS H. RYAN.
BY Chas. E. Townsend
ATTORNEY.

Dec. 12, 1944.    T. H. RYAN    2,364,919
TRANSMISSION MECHANISM
Filed July 20, 1942    7 Sheets-Sheet 6

INVENTOR,
THOMAS H. RYAN.
BY
Chas. E. Townsend
ATTORNEY.

Dec. 12, 1944.　　　T. H. RYAN　　　2,364,919
TRANSMISSION MECHANISM
Filed July 20, 1942　　　7 Sheets-Sheet 7
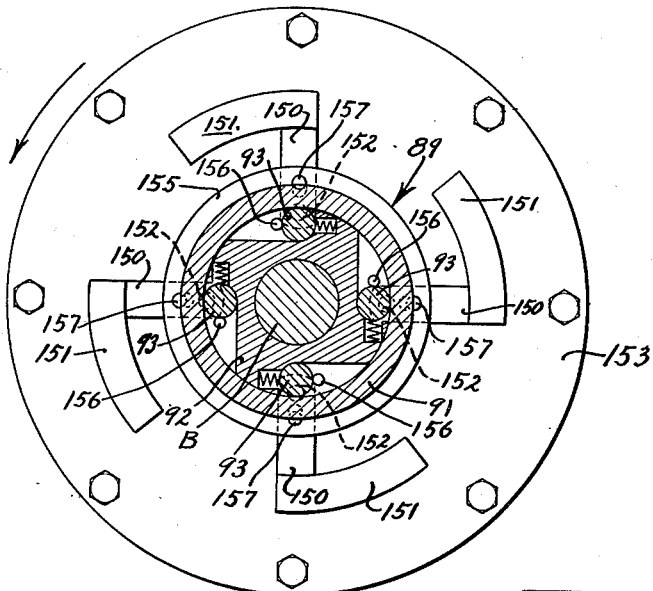
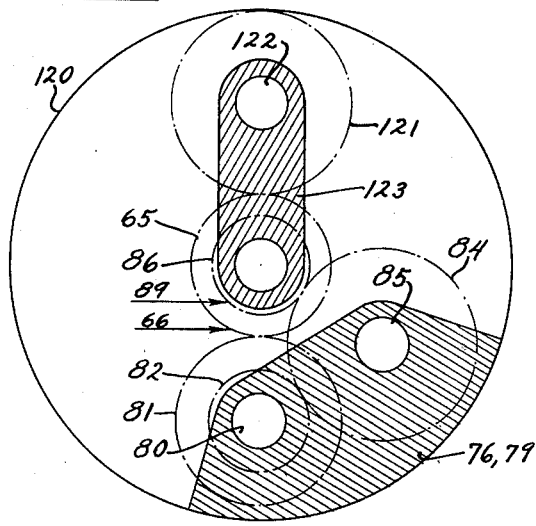
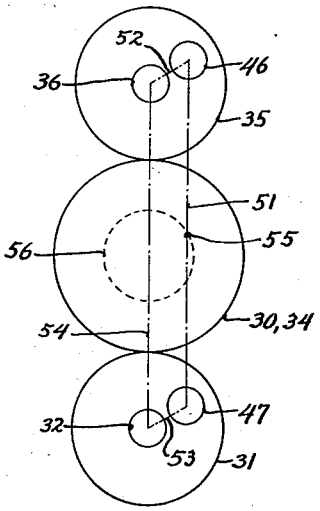
INVENTOR,
THOMAS H. RYAN.
BY Chas. E. Townsend
ATTORNEY.

Patented Dec. 12, 1944

2,364,919

UNITED STATES PATENT OFFICE 2,364,919

TRANSMISSION MECHANISM

Thomas H. Ryan, San Francisco, Calif.; Margaret I. Ryan executrix of said Thomas H. Ryan, deceased Application July 20, 1942, Serial No. 451,543

14 Claims. (Cl. 74—260)

This invention relates to variable speed power transmission mechanisms, and particularly to transmissions useful in automotive vehicles where the traction wheels are to be driven at various speed ratios with respect to the speed of the motor in accordance with the load.

The invention to be disclosed and claimed herein is in the nature of an improvement over my copending application, Serial No. 298,939, filed October 11, 1939, and now Patent Number 2,290,210, issued July 21, 1942.

Among the objects of this invention is the provision of a transmission mechanism capable of transmitting motor torque to the load shaft at infinitely variable speeds from zero to motor speed; the provision of means in the transmission mechanism for automatically increasing the angular speed of the load shaft as the load decreases; and the provision of means in the transmission mechanism for performing the function of a clutch but automatically operable gradually to transmit motor torque to start the load shaft rotating without sudden shock. Other objects and advantages will appear hereinafter.

In general, the transmission mechanism of my invention accomplishes an increase in the ratio of the angular speed of the load shaft to that of the motor shaft in two operational stages. In the first stage the angular speed of the load shaft increases from zero to an intermediate speed. During operation in this stage the load shaft is driven from the motor shaft through a torque converter and a reduction gearing. The torque converter is a double epicyclic gear train in which the common train arm is automatically accelerated from zero to the speed of the drive gear as load decreases and speed increases. The reduction gearing is an epicyclic gear train in which the last gear is stationary and acts as a traction gear while the train arm is connected directly to the load shaft.

In the second stage, the load shaft is driven from a differential, the driven gear of which is connected to the load shaft. This differential is an epicyclic gear train in which power is applied to the train arm. As the torque reaction of the load shaft decreases and its speed increases the train arm of the differential is automatically caused to increase in speed by an accelerator mechanism, thus increasing the speed of the driven gear of the differential until the driven gear and load shaft are rotating at the same speed as the motor shaft.

The accelerator comprises an epicyclic gear train of which the train arm is the train arm of the differential. By retarding the gear on the train arm the arm is caused to accelerate, thereby imparting added speed to the load side of the differential.

These four epicyclic gear trains comprise the power transmission mechanism, the gears of which are all constantly in mesh, and which is capable of infinitely variable speed ratios from zero to one, from no drive to direct drive.

Proceeding now with a detailed description of a mechanism in which my invention has been embodied, reference is to be had to the drawings in which:

Fig. 1 is a vertical longitudinal section through the transmission.

Fig. 2 is an elevation of the front end, that is, the left end in Fig. 1.

Fig. 3 is a horizontal section taken as indicated by the line 3—3 in Fig. 2.

Figs. 4 to 14 are vertical transverse sections taken as indicated by the respective section lines in Fig. 1.

Fig. 4 shows the centrifugal weights employed in the torque converter.

Figs. 5 and 6 show the gear trains in the torque converter.

Fig. 7 shows the centrifugal weights used in the differential accelerator mechanism.

Figs. 8 and 9 show the gear trains in the accelerator mechanism.

Fig. 10 shows a one-way brake.

Fig. 11 shows the differential.

Fig. 12 shows a reduction gearing.

Fig. 13 shows the annular carrier for gears in the reduction gearing.

Fig. 14 shows a one-way brake.

Fig. 15 is a skeleton diagram of the combined second and third epicyclic trains.

Fig. 16 is a skeleton diagram to be used as an aid in describing the torque converter.

Figure 4:
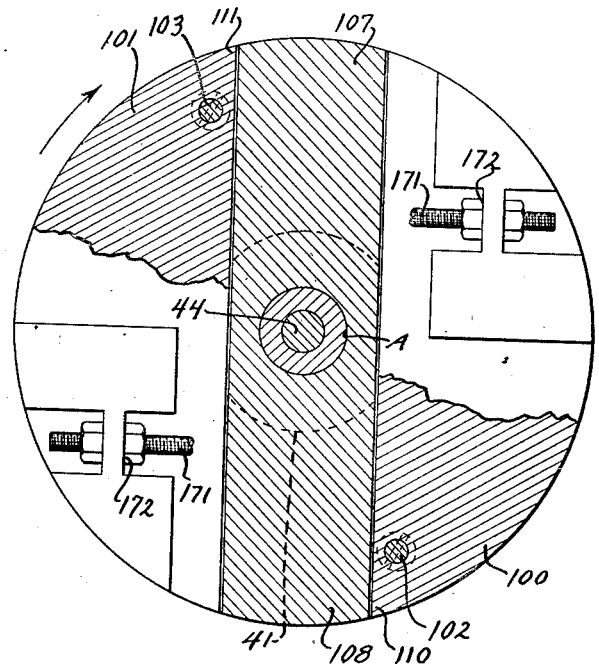

The transmission (Fig. 1) is employed to transmit power from the motor shaft A to the load shaft B. The motor shaft A may be continuously connected to the motor (not shown). No clutch is necessary. The transmission mechanism may be enclosed in a case which is not shown in its entirety but parts of it are indicated at C in Figs. 1 and 2.

The torque converter comprises a double epicyclic gear train, having a common train arm and means for driving the pinions in the respective trains in synchronism. At the rear end of the motor shaft A (Fig. 1) is a gear 30 integral therewith. Meshing with the gear 30 is a pinion 31, rotatable on a stud shaft 32 integral with the rear wall 33 of a cylindrical housing 34 which is coaxial with the motor shaft A.

Figure 6:
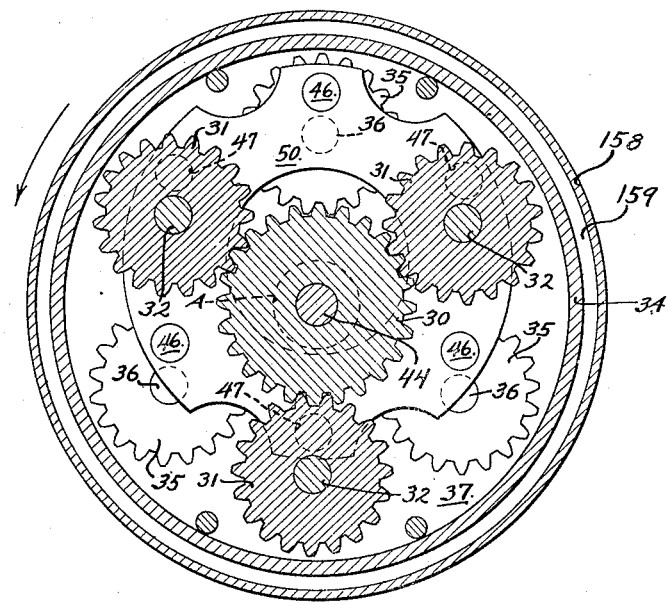

Referring to Fig. 6, there are two other pinions identical to the pinion 31 which have accordingly been given the same reference numerals. These three pinions 31 all mesh with the gear 30 and their stud shafts 32 are carried by the housing 34. The axes of the stud shafts 32 are spaced apart one-hundred-twenty degrees on a circle concentric with the axis of gear 30.

Three pinions 35, identical to the pinions 31, are rotatably mounted on stud shafts 36 carried by the front wall 37 of the housing 34. The axes of the stud shafts 36 are spaced apart one-hundred-twenty degrees on the same circle as the axes of stud shafts 32. Furthermore, the axis of each stud shaft 32 is disposed sixty degrees from the adjacent stud shaft 36. In this manner the axes of the pinions of the two groups are alternately spaced apart at equal angular intervals around the axis of motor shaft A and at equal radial distances therefrom.

Referring to Fig. 1, it is to be noted that the two groups of pinions are spaced apart longitudinally of the motor shaft, pinions 31 being carried on the rear wall 33 of the housing and pinion 35 on the front wall 37. The pinions 35 mesh with a gear 40 rotatable on the shaft A and identical and co-axial with the gear 30. The gear 40 has a hub 41 on which a bearing flange 42, on the front wall 37 of the housing, is rotatably supported. The rear wall 33 of the housing 34 is supported on a sleeve 43 rotatable on the reduced extension 44 of the load shaft B. A key 45 secures the housing to the sleeve for rotation therewith. Thus the housing is supported for rotation about the axis of gears 30 and 40.

The housing 34 constitutes the common train arm of a double epicyclic gear train, and when this arm rotates it carries the pinions 31 around the axis of gear 30 and the pinions 35 around the axis of gear 40. Means are provided for maintaining the pinions 31 in synchronism with the pinions 35. Each pinion 35 has a crank pin 46 disposed parallel to the stud shaft 36 and projecting rearwardly from the pinion. Similarly, each pinion 31 has a crank pin 47 disposed parallel to the stud shaft 32 and projecting forwardly from the pinion. The crank pins are all spaced the same radial distance from their pinion shafts. The crank pins 46 and 47 are linked together by a connecting ring 50.

Referring to Fig. 6, it will be noted that the crank pins 46 on the pinions 35 are journaled in the connecting ring 50 at points spaced equidistant at one-hundred-twenty degrees around the ring. Similarly, the crank pins 47, on the pinion 31, are journaled in the ring at points equidistant from each other and from the crank pins 46. The axes of the crank pins 46 and 47 are thus arranged alternately at equal angular distances apart and at equal distances from the geometric center of the connecting ring. This center travels in a circle about the common axis of gears 30 and 40 so that the ring has an eccentric movement. Furthermore, the gears 31 and 35 rotate on their own axes in synchronism by reason of the fact that the connecting ring maintains the crank arms parallel.

The law of operation of this mechanism will now be explained by reference to Fig. 16, which is a skeleton diagram showing a diametric pair of the gears 31 and 35 meshing with coaxial gears 30 and 40, respectively. The crank pin 46 is connected to the crank pin 47 by the connecting link 51, which is the kinematic equivalent of the connecting ring 50. The crank arm 52 extends from the center of pinion shaft 36 to the center of crank pin 46. Likewise, 53 is the crank arm of pin 47. Shafts 32 and 36 are equidistant from the axis of gears 30 and 40 and the distance between these shafts is fixed, both being carried by the housing 34, which is accordingly represented by the link 54. For purposes of analysis this link can be treated as fixed. The crank arms 52 and 53 are the same length. The links 51 and 54 are the same length. This is evident from an inspection of Fig. 6 where the distance from the crank pin 46 at top dead center to the crank pin 47 at bottom dead center is equal to the distance between the corresponding pinion shafts 36, 32, because they are all in line and the crank pins are the same distance from their respective pinion shafts.

The links 51, 52, 53, 54 comprise a quadric chain, opposite sides of which are equal and parallel. From this it follows that if one crank is rotated, the other crank will rotate and remain parallel to it. Therefore, pinions 35 and 31 are always in synchronism and are subject to simultaneous and equal angular displacement. Also, the locus of the center 55 of the connecting link 51 is the circle 56 whose center is on the axis of gears 30, 40. Since the center 55 geometrically represents the center of connecting ring 50 (Fig. 6), this ring has eccentric movement with respect to the motor shaft.

The sleeve 43 (Fig. 1), to which the torque converter housing 34 is keyed, has a gear 60 secured thereon by a key 61 (Fig. 8). The gear 60 has a diametric pair of arcuate slots 62, through which pass a pair of studs 63 which project forwardly from a gear 64 (Fig. 9). When the studs 63 are disposed in the slots, as shown in Fig. 8, the gear 60 may impart counterclockwise rotation to the gear 64.

Figure 10:
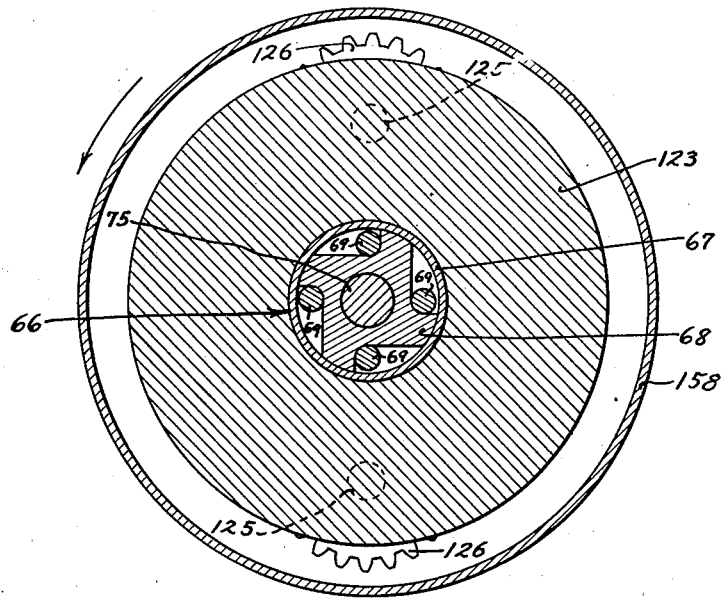
Figure 11:
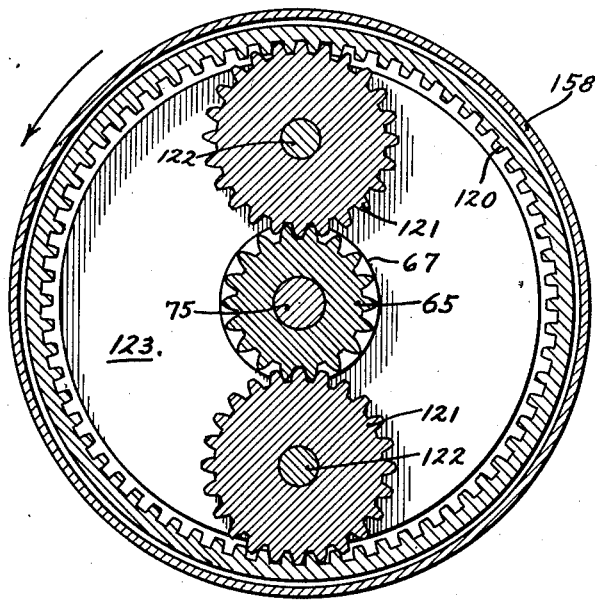

The gear 64, in turn, may impart rotation to a gear 65 (Fig. 1) through the medium of a one-way non-slip clutch 66 (Fig. 10). The gear 64 has a rearwardly projecting annular rim 67, within which is disposed the camming element 68 formed integrally with the gear 65 and having the rollers 69. This clutch 66 prevents the element 68 from rotating clockwise relative to the rim 67 and enables the gear 64 to impart counterclockwise rotation to the gear 65 (Fig. 11), which is rotatably mounted on the portion 75 of the load shaft B.

Figure 12:
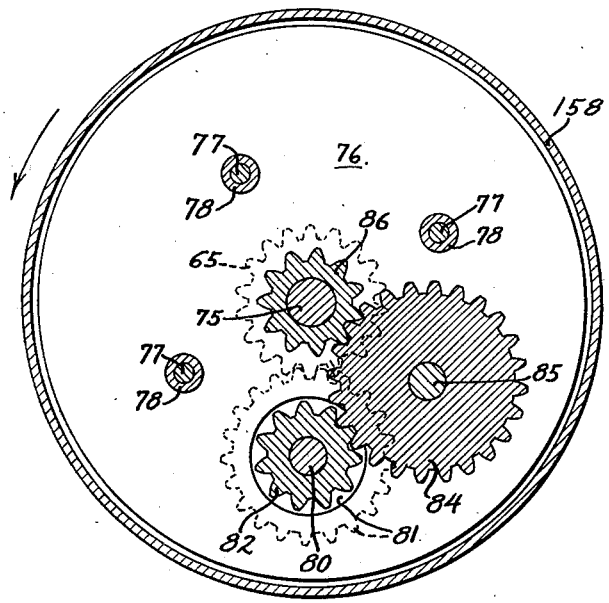
Figure 13:
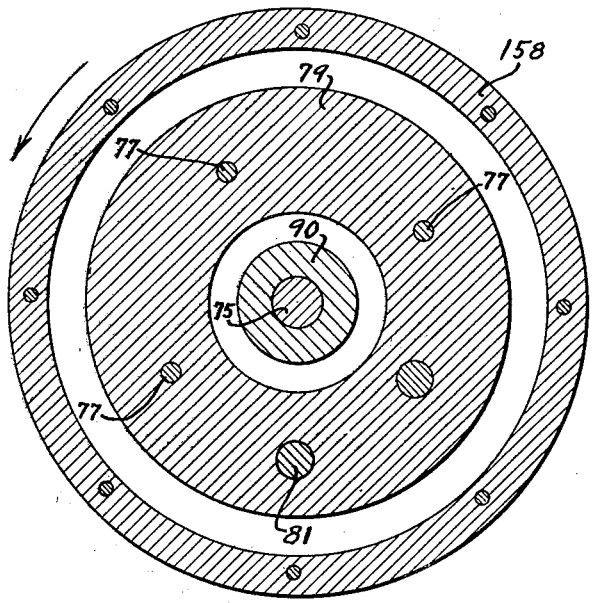

The gear 65 (Fig. 1) is the first gear of an epicyclic gear train which serves as a reduction gearing. The epicyclic train arm is a disk 76, which is keyed to the portion 75 of the load shaft B. The disk 76 has rigidly secured thereto, by means of bolts 77 and spacer sleeves 78, an annular plate 79 (Figs. 1 and 13). Supported in the plate is a forwardly projecting stud shaft 80, on which a double pinion is rotatably supported. The large diameter pinion 81 meshes with the gear 65 (Fig. 1) and the small diameter pinion 82 meshes with an intermediate gear 84 (Fig. 12) which is rotatably supported by a stud shaft 85 secured to the annular plate 79 (Fig. 13). The gear 84 meshes with the gear 86 which is rotatably supported on the load shaft. The gear 86 is the last gear of the epicyclic train. A one-way brake 89 (Fig. 1) prevents the gear 86 from rotating one way relative to the transmission case C.

For this purpose the gear 86 has a hub 90 which extends rearwardly within a concentric annular flange 91 on the case C. The camming element 92 (Fig. 14) is formed integrally with the hub 90. Rollers 93 prevent the element 92 from rotating clockwise with respect to the flange 91, or, in other words, the gear 86 is prevented from rotating clockwise in Fig. 12.

Figure 5:
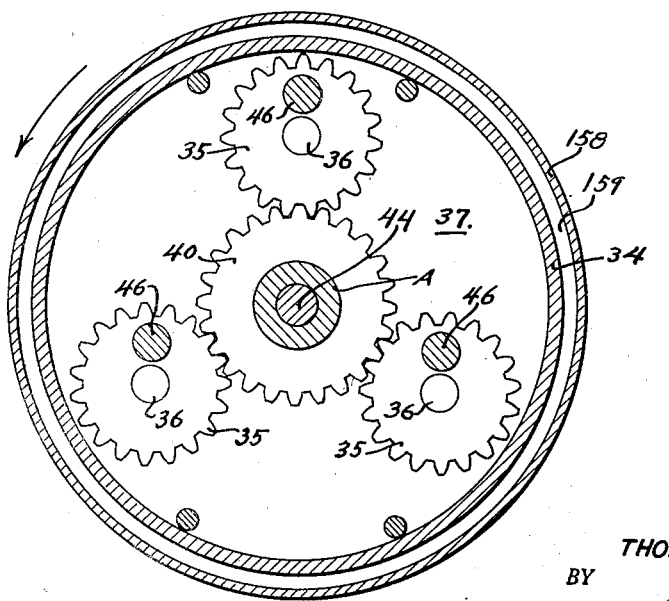

The manner in which power is transmitted from the motor shaft A to the load shaft B during the first stage of the transmission operation can now be explained. Assume the shaft B to be loaded and stationary; and assume the motor shaft to be idling slowly. Then gear 30 (Fig. 6) will be rotating counter-clockwise and gears 31 meshing therewith will be rotated clockwise. The pinion shafts 32 will be standing still because the housing 34, which carries them, is connected to the load shaft B, as described, and the load shaft is stationary. Therefore, the housing is also stationary. The pinions 31, through their crank pins 47, will impart eccentric motion to the connecting ring 50 and this, in turn, through the crank pins 46, will rotate the pinions 35 on their stationary shafts 36 in synchronism with the pinions 31. The pinions 35, meshing with the gear 40 (Fig. 5), will rotate it counterclockwise in synchronism with the gear 30. Thus the load shaft remains stationary while the motor shaft rotates.

In this no-drive condition the train value of the transmission is zero, because the train value is the ratio of the angular speed of the driven shaft B to the angular speed of the drive shaft A. This condition can obtain not only when the motor shaft is rotating at slow speed but also at high speed, provided the load is preponderant and the shaft B does not turn.

For example, in an automotive application of this invention, if the vehicle wheel brakes were set, the motor could be run at high speed without the transmission effecting any movement of the load shaft, as will perhaps be more apparent later. However, the torque converter in either case would operate as just explained, namely, the pinions 31 and 35 would rotate on stationary axes. Nevertheless, as soon as, and whenever, the load is within the power of the motor, the transmission will cause rotation of the load shaft, as will now be explained.

The torque converter has an automatic torque-speed-responsive control mechanism comprising a pair of weighted levers 100, 101 (Fig. 4) formed as segments of a circle and rotatably supported on pivots 102, 103, respectively, carried by a bracket 104 (Fig. 2) secured to the motor shaft A by a key 105 (Fig. 1) for rotation therewith. The hub 41 of the gear 40 has formed integrally therewith at its front end a diametric pair of radial arms 107, 108. These arms are in the form of a broad flat piece which is disposed between the segmental levers 100, 101 (Figs. 3 and 4) so that when the parts are at rest, as shown, the sides of the arms are parallel to the chord sides of the segmental arms with a small clearance therebetween. The operation of this control mechanism will now be described.

Referring to Fig. 4, it should first be kept in mind that the radial arms 107, 108 are integral with the hub of gear 40 and, therefore, rotate as one with gear 40, and that pivots 102, 103 are integral with bracket 104 keyed to shaft A and, therefore, rotate as one with gear 30.

As previously explained, when motor shaft A rotates, gear 30 drives gear 40 in synchronism therewith through the pinions 31, ring 50, and pinions 35. This means that arms 107, 108 and pivots 102, 103 also rotate with the same angular speed and in a clockwise direction as viewed in Fig. 4. However, as the weighted levers 100, 101 are carried around with these parts, centrifugal forces, depending in amount upon the speed, tend to rotate the levers upon their pivots in a clockwise direction. This results in the application of a turning couple on the arms 107, 108 by the points 110, 111 of the levers. The arms 107, 108 (and gear 40) are thus turned clockwise (Fig. 4) relative to pivots 102, 103 (and gear 30). The result is that gear 40 is advanced in the direction of its original rotation, is moved out of phase with gear 30, and is now a driving gear instead of a driven gear. The drive is now transmitted from motor shaft A (Fig. 4) through bracket 104 to pivots 102, 103, through levers 100, 101 to arms 107, 108 and gear 40.

Before continuing with the explanation, it will avoid confusion to note in Fig. 1 that section 4 is taken looking rearward, while succeeding sections are taken looking forward, so that motor shaft A (Fig. 5) is rotating counter-clockwise as viewed in that figure. To further explain how gear 40 becomes the driving gear, it will be recalled that originally the gear 30 (Fig. 6) rotating counterclockwise drove pinion 31 clockwise. If viewed through a stroboscope at the pitch point, the leading face of a tooth on gear 30 would be in engagement with the trailing face of a tooth on pinion 31. Similarly, viewing the pitch point of a pinion 35 (Fig. 5) and gear 40, pinion 35, rotating clockwise, was driving gear 40 counterclockwise, the leading face of a tooth on pinion 35 engaging the trailing face of a tooth on gear 40.

Now when centrifugal force acts on weighted levers 100, 101 (Fig. 4) the gear 40 (Fig. 5) is turned counterclockwise relative to motor shaft A with which it was previously being driven in synchronism. Viewed through a stroboscope at the pitch point of gear 40 and pinion 35, gear 40 now drives pinion 35, by moving the leading face of a tooth on gear 40 into engagement with the trailing face of a tooth on pinion 35. The pinion 35 thus receives a clockwise torque which is transmitted through the ring 50 to the pinion 31. The pinion 31 (Fig. 6) was being driven clockwise by gear 30. With the added clockwise torque it receives from pinion 35, the leading face of a tooth on pinion 31 moves into engagement with the trailing face of a tooth on gear 30, and, as the speed increases, applies increasing pressure to the tooth of gear 30. However, for the purpose of this analysis, gear 30 can be considered as fixed so that the pitch point on gear 30 becomes a fulcrum for pinion 31.

The torque reaction of the load, modified by the reduction gearing, opposes counterclockwise rotation of the housing 34, so that the torque reaction can be considered as a force acting clockwise through a stud shaft 32 (for example, to the left from the stud shaft 32 at bottom dead center in Fig. 6), and acting normal to the moment arm which is a line from the center of stud shaft 32 to the center of motor shaft A. The torque applied to the pinion 31 by the pinion 35 can be considered as a force applied to the crank pin 47 and tending to rotate pinion 31 clockwise; in other words, a force directed to the right from crank pin 47 and having a moment arm represented by a line from the center of crank pin 47 to the pitch point on gear 30. This point is a fulcrum of this lever system.

When the moment of the force applied at the crank pin 47 exceeds the moment of the force applied at the stud shaft 32 the moment arm of 32 is rotated counterclockwise, that is, the housing 34 starts to rotate counterclockwise. The principal function of the force applied at the crank pin 47 is speed because it is derived from the centrifugal force on the weighted arms 100, 101, whereas the force applied at the stud shaft 32 is a function of the torque reaction of the load. Thus the control mechanism is characterized as an automatic torque-speed-responsive mechanism.

In accordance with the law of operation of an epicyclic gear train, the torque converter now proceeds to operate as follows: As the train arm (housing 34) is accelerated counterclockwise, the angular speed of the pinions 31 and 35, relative to the train arm, decreases, although the pinions continue to rotate clockwise on their own axes. Finally, the relative speed of the pinions is reduced to zero and their absolute speed, as well as that of the housing, becomes equal to the angular speed of the gears 30, 40. When this point is reached, the housing 34 is rotating in synchronism with motor shaft A.

When the housing 34 (Fig. 1) begins to turn, the gears 60, 64 and 65 turn with it. Consequently, the epicyclic reduction gear (Fig. 12) acts as follows: The gear 65 rotates counterclockwise, the pinions 81, 82 clockwise, the intermediate gear counterclockwise, and the last gear 86, being braked against clockwise rotation, remains stationary. As a result, the train arm rotates counterclockwise and the disk 76, being fixed thereto, also rotates counterclockwise. With the gear proportions shown, the angular speed of the train arm (disk 76) is about one-half the angular speed of gear 65 and in the same direction. Obviously, these gears could be designed to give any desired reduction.

When the housing 34 (Fig. 1) of the torque converter is rotating in unison with the motor shaft A, the gear 65 is rotating at the same speed and the load shaft B, to which the disk 76 is keyed, is rotating at about one-half the angular speed of the motor shaft A. This terminates the first stage wherein the train value of the transmission has automatically increased under torque-speed control from zero to about one-half. Without hiatus, however, the second stage proceeds, as will now be explained.

Before proceeding with the explanation of the second stage of the operation, it is to be noted, with respect to the torque converter, that it prevents the motor from being overloaded at any time; it permits the motor shaft to go on turning even when the load shaft comes to a dead stop as when the vehicle stalls; and it also permits the motor to be started without disconnecting the motor from the transmission.

During the first stage when the described trains were transmitting power, other trains were in motion but were not transmitting power to the load shaft and were, therefore, not explained in order to avoid confusion. These trains will now be described first as to the manner of their movements during the first stage and then during the second stage.

It will be recalled that in the reduction gearing the gear 65 (Fig. 1) was the first gear of the epicyclic train and the disk 76 was the train arm. These two elements are in another epicyclic train. The disk 76 has formed integrally therewith an internal gear 120. A diametric pair of intermediate gears 121 mesh with both the internal gear 120 and the gear 65. The gears 121 are rotatably mounted on stud shafts 122, projecting rearwardly from an annular carrier 123 rotatably supported on the rim 67 (Fig. 10). During the first stage when the gear 65 (Fig. 11) rotates counterclockwise, the internal gear 120 rotates about one-half the angular speed of 65 counterclockwise. As a result the train arm (carrier 123) rotates counterclockwise and gears 121 rotate clockwise on their shafts 122.

At the beginning of the second stage the angular speed of the train arm is increased by a torque-speed-responsive accelerator which will now be described.

The annular carrier 123 (Fig. 1) is also the train arm of another epicyclic train. Projecting forwardly therefrom are stud shafts 125, on which are rotatably mounted a diametric pair of pinions 126, each of which meshes with both gears 60 and 64. A mechanism of this construction and mode of operation is disclosed in my copending application, Serial Number 298,939, filed October 11, 1939, and now Patent Number 2,290,210, issued July 21, 1942. As there disclosed, the teeth of gears 60 and 64 are normally in alignment. If gear 64 (Fig. 9) is advanced counterclockwise ahead of gear 60 (Fig. 8) the two teeth of these gears disposed in the same tooth space of the gear 126 act as an expanding tooth taking up the backlash and resist rotation of gear 126 on its shaft 125. This causes the carrier 123 to rotate counterclockwise (Fig. 10). The carrier was already rotating counterclockwise at the end of the first stage; so in the second stage it is accelerated.

Figure 7:
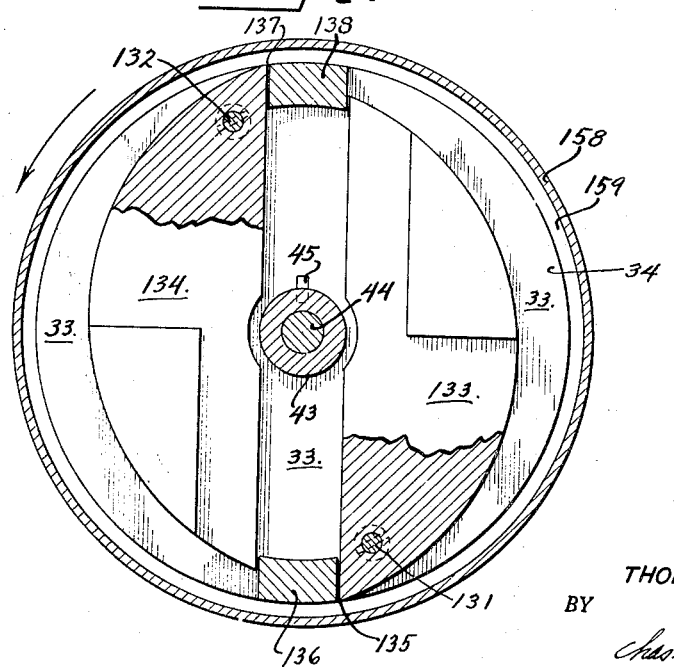

The means for angularly displacing the gear 64 counterclockwise ahead of the gear 60 (Figs. 8 and 9) will now be explained. The studs 63, which project forwardly from the gear 64 through the slots 62 in the gear 60, are secured in a plate 130 (Fig. 1) which is rotatably supported on the sleeve 43. Projecting forwardly from the plate 130 are the pivots 131, 132 (Figs. 7 and 8) of weighted levers 133, 134, respectively. These levers are designed to rotate on their pivots under the influence of centrifugal force when the proper speed has been reached. When they do so the lever 133 fulcrums at 135 on a boss 136 projecting rearwardly from the rear wall 33 of the housing 34, and lever 134 fulcrums at 137 on a similar boss 138. The result is that pivots 131, 132 are moved away from the bosses 136, 138, respectively, in a counterclockwise direction, thus imparting rotation to the plate 130 and advancing the gear 64 (Fig. 9) counterclockwise. As previously explained, this accelerates the carrier 123. When the gear 64 has been advanced to the point where the gears 126 cease to rotate on their axes, the carrier has attained the same angular speed as the gears 60, 64.

Let us now examine the effect of accelerating the carrier 123 in the second stage by reference to the skeleton diagram in Fig. 15. The carrier 123 is the train arm of the epicyclic gear train of which 65 is the first gear, 120 is the last gear, and 121 is the intermediate gear. This train acts as a differential as will presently appear. Through two common elements this train is connected to a second epicyclic train, namely, the reduction gearing, of which 65 is the first gear, 86 is the last gear, and 81, 82, 84 are intermediate gears carried by the train arm 76—79, which, being integral with internal gear 120, will hereafter be referred to under that numeral.

It will be recalled that at the conclusion of the first stage gear 65 was rotating counterclockwise at the same angular speed as the motor shaft; gear 86 was held against clockwise rotation by the brake 69; and train arm gear 120, which is keyed to the load shaft B, was rotating about one-half the angular speed of gear 65 counterclockwise; and train arm 123 and gear 121 were idling.

When the train arm 123 is accelerated, the gear 65 increases in speed, overrunning the one-way brake 66, and, through the reduction gearing, drives the internal gear 120 at increased speed. The acceleration of train arm 123 terminates when the gears 126 in the accelerator mechanism are locked to the gears 60 and 64, at which time the train arm 123 has attained motor speed. Direct drive is established by the internal gear 120 and the train arm 123 rotating at motor speed, all the trains rotating in unison.

In this way the transmission serves to transmit power from the motor shaft A to the load shaft B through infinitely variable speed ratios automatically adjusted in accordance with the factors of speed and torque and ranging from zero to one, i. e., from no drive to direct drive.

Preferably, the brake 89 (Fig. 14) is provided with means for positively disengaging the rollers 93 after the brake ceases to function at high speed. This means is similar to that disclosed in my afore-mentioned application. Four identical levers 150, having weights 151 at their outer ends, have forwardly-extending pivot pins 152, engaging in apertures in a plate 153 keyed to the hub 95 (Fig. 1) of gear 86. An annular ring 155, rotatably supported on hub 90, has four pins 156 (Fig. 14) projecting rearwardly into the roller pockets and has four slots which receive rearwardly projecting pins 157 on the levers. When centrifugal force acts on the weights 151, the levers 150 rotate the ring clockwise and the pins 156 retract the rollers 93 against their springs. The plate 153 is secured by cap screws to a cylindrical housing 158, the front wall 159 of which is rotatably supported on the annular flange 42 of the front wall 37 of the housing 34.

A manual control may be provided for the torque converter. This is shown in Figs. 1 to 3. A sleeve 160 is mounted on the shaft A and is adapted to be slid longitudinally thereon. To enable the sleeve to be moved back and forth, it has a ball bearing thereon, the outer race 161 of which has horizontal trunnions 162 received in the slotted ends of a forked lever 163 having trunnions 164 supported in the transmission case C. The sleeve has vertical trunnions 165 which operate identical linkages, the lower of which will be described.

The trunnion 165 in moving back and forth turns a crank 166 by engaging in the slot 167. The crank 166 is supported on a stud 168 projecting upwardly from a boss 169 on the bracket 104. The crank pin 170 has a connecting rod 171 attached thereto which is adjustably connected to the weight lever 101 at 172. A similar linkage connects the upper trunnion 165 to the weight lever 100. Thus the manual control lever can be used to adjust positively the gear 40 and obtain any desired ratio in the torque converter.

When the manual control lever 163 is pushed rearwardly the weight levers 100, 101 are positively drawn inwardly and gear 40 is placed in idling position so that the torque converter is in a neutral position where it cannot transmit power from the motor shaft A. When the lever is moved forwardly and released, the torque converter is free to function automatically as described. When the lever is moved forwardly and held, the torque converter is caused to transmit power. This is useful where a sudden application of power to the load is needed. The motor can be started with the manual control lever retained in neutral position or with the lever released in forward position.

Having thus described and illustrated my invention, what I claim and desire to secure by Letters Patent is:

1. A mechanism for transmitting power to a load shaft from a motor shaft comprising a torque converter adapted to transmit constant motor torque therethrough from motor to a driven element without increase or decrease of motor speed, or motor torque, and having a driven element, having means to drive said driven element from said motor shaft in a speed ratio infinitely variable from zero to one, and having a torque-speed-responsive control means for said driving means to determine automatically the speed ratio of said driven element to said motor shaft, a manual control means operable upon said automatic control means to enable the operator to obtain any desired speed ratio, and gear means to transmit power from said driven element of said torque converter to said load shaft.

2. A mechanism for transmitting a power to a load shaft from a motor shaft comprising a torque converter adapted to transmit constant motor torque therethrough from motor to a driven element without increase or decrease of motor speed, or motor torque, and having a driven element, having means to drive said driven element from said motor shaft in a speed ratio infinitely variable from zero to one, and having a torque-speed-responsive control means for said driving means to determine automatically the speed ratio of said driven element to said motor shaft, and means to drive said load shaft from said driven element of said torque converter in a speed ratio infinitely variable from a predetermined value intermediate zero and one to a value of one, and a torque-speed-responsive control means for said load shaft drive means to determine automatically the speed ratio of said load shaft to said driven element of said torque converter.

3. A mechanism for transmitting power to a load shaft from a motor shaft comprising a torque converter adapted to transmit constant motor torque therethrough from motor to a driven element without increase or decrease of motor speed, or motor torque, and having a driven element, and having means to drive said driven element from said motor shaft in a speed ratio infinitely variable from zero to one, means to drive said load shaft from said driven element, including a reduction gearing comprising an epicyclic gear train adapted to drive said load shaft at a predetermined ratio of speed with respect to said driven element said gear train having a train arm, means to connect the first gear of said train to said driven element, and means to connect the said train arm of said train to said load shaft.

4. A mechanism for transmitting power to a load shaft from a motor shaft comprising a torque converter adapted to transmit constant motor torque therethrough from motor to a driven element without increase or decrease of motor speed, or motor torque, and having a driven element, and having means to drive said driven element from said motor shaft in a speed ratio infinitely variable from zero to one, means to drive said load shaft from said driven element, including a reduction gearing comprising an epicyclic gear train adapted to drive said load shaft at a predetermined ratio of speed with respect to said driven element said gear train having a train arm, means to connect the first gear of said train to said driven element, means to connect the said train arm of said train to said load shaft, and means to prevent rotation of the last gear of said train in a direction opposite to that of said first gear.

5. A mechanism for transmitting power to a load shaft from a motor shaft comprising a torque converter adapted to transmit constant motor torque therethrough from motor to a driven element without increase or decrease of motor speed, or motor torque, and having a driven element, and having means to drive said driven element from said motor shaft in a speed ratio infinitely variable from zero to one, and means to drive said load shaft from said driven element including a differential comprising an epicyclic gear train having a train arm, the last gear of said train being connected to said load shaft, the said train arm of said train being controlled by a torque-speed-responsive accelerator mechanism.

6. A mechanism for transmitting power to a load shaft from a motor shaft comprising a torque converter having a driven element, and having means to drive said driven element from said motor shaft in a speed ratio infinitely variable from zero to one, means to drive said load shaft from said driven element including a differential comprising an epicyclic gear train having a train arm, the last gear of said train being connected to said load shaft, the said train arm of said train being controlled by a torque-speed-responsive accelerator mechanism comprising a second epicyclic gear train, the first gear thereof being driven by said torque converter, the train arm thereof being the train arm of said first train.

7. A mechanism for transmitting power to a load shaft from a motor shaft comprising a torque converter having a driven element, and having means to drive said driven element from said motor shaft in a speed ratio infinitely variable from zero to one, and means to drive said load shaft from said driven element including a differential comprising an epicyclic gear train having a train arm, the last gear of said train being connected to said load shaft, the said train arm of said train being controlled by a torque-speed-responsive accelerator mechanism comprising a second epicyclic gear train, the first gear thereof being driven by said torque converter, the train arm of said second epicyclic gear train being the train arm of said first train, said train arm carrying a gear meshing with said first gear of said second train, and means to retard rotation of said train arm gear on its axis to cause acceleration of said train arm and thereby to cause transmission of accelerating power through said differential to said load shaft.

8. A mechanism for transmitting power to a driven element from a driving shaft in a speed ratio infinitely variable from zero to one comprising two epicyclic gear trains having two coaxial driving gears and a common train arm connected to said driven element said train arm having rotatably mounted thereon two groups of epicyclic pinions, each group belonging, respectively, to one of said two epicyclic gear trains, a rigid member having eccentric movement relative to the axis of said gears to connect the said epicyclic pinions in the two trains for synchronous rotation on their own axes, one of said driving gears being fixed to said shaft, the other being rotatable with respect to said shaft, and a torque-speed-responsive control means for adjusting automatically said rotatable gear relative to said shaft.

9. A mechanism for transmitting power to a driven element from a driving shaft comprising two epicyclic gear trains having coaxial driving gears and a common train arm connected to said driven element, two groups of pinions rotatably mounted on said arm, one group meshing with one of said gears, the other group meshing with the other of said gears, the axes of the pinions in the two groups being alternately spaced apart at equal angular intervals around the axis of said gears and at equal radial distances therefrom, each pinion having a crank pin, a ring in which said pins are journaled, said pins being arranged alternately at equal angular distances apart and at equal distances from the geometric center of said ring, said center revolving in a circle around the axis of said gears, whereby all said pinions are confined to synchronous rotation on their axes.

10. A mechanism for transmitting power to a driven element from a driving shaft in a speed ratio infinitely variable from zero to one comprising two epicyclic gear trains having two coaxial driving gears and a common train arm connected to said driven element, said train arm having rotatably mounted thereon two groups of epicyclic pinions, each group belonging, respectively to one of said two epicyclic gear trains, a rigid member having eccentric movement relative to the axis of said gears to connect the said epicyclic pinions in the two trains for synchronous rotation on their own axes, one of said driving gears being fixed to said shaft, the other being rotatable with respect to said shaft, and a torque-speed-responsive control means for automatically adjusting said rotatable gear relative to said shaft, and a manual control means connected to said automatic control means to determine positively the position of said rotatable gear relative to said shaft.

11. A mechanism for transmitting power to a driven element from a driving shaft in a speed ratio infinitely variable from zero to one, comprising two epicyclic gear trains having a common train arm connected to said driven element, said train arm having rotatably mounted thereon two groups of epicyclic pinions, each group belonging, respectively to one of said two epicyclic trains, means to connect an epicyclic pinion in one train to an epicyclic pinion in the other train for synchronous rotation on their own axes, a gear on said driving shaft meshing with said epicyclic pinion of one train, a second gear meshing with said epicyclic pinion of the other train, and means, including a member secured to said driving shaft, for moving said second gear relative to said first gear to cause rotation of said train arm.

12. A mechanism for transmitting power to a driven element from a driving shaft in a speed ratio infinitely variable from zero to one comprising two epicyclic gear trains having a common train arm connected to said driven element, an epicyclic pinion in each train having a crank pin, a rigid member connecting said crank pins to cause said pinions to rotate in synchronism, the driving gear of the first train being secured to said driving shaft, the driving gear of the second train being rotatable on said shaft, and means operable to advance said second driving gear relative to said shaft and to drive said gear from said shaft comprising means mounted for rotation with said shaft and for movement in response to the action of centrifugal force, the movement of said means being imparted to said second gear to advance said gear to cause said train arm to rotate.

13. A mechanism for transmitting power to a driven element from a driving shaft in a speed ratio infinitely variable from zero to one comprising two epicyclic gear trains having a common train arm connected to said driven element, an epicyclic pinion in each train having a crank pin, a rigid member connecting said crank pins to cause said pinions to rotate in synchronism, the driving gear of the first train being secured to said driving shaft, the driving gear of the second train being rotatable on said shaft, and means operable to advance said second driving gear relative to said shaft and to drive said gear from said shaft comprising a weighted lever mounted for rotation with said shaft and for pivotal movement under the influence of centrifugal force, said pivotal movement being utilized to advance said second gear to cause said train arm to rotate.

14. A mechanism for transmitting power to a driven element from a driving shaft in an infinitely variable speed ratio comprising two epicyclic gear trains having coaxial driving gears and a common train arm connected to said driven element, one of said gears being fixed to said driving shaft, the second gear being rotatable with respect to said shaft, and a torque-speed-responsive control means for adjusting said second gear relative to said shaft comprising a pair of levers pivotally mounted on a member rotating in synchronism with one of said gears, the pivotal axes of said levers being parallel to the axis of said shaft, one arm of each lever being heavier than the other, the lighter arms bearing against a member rotating in synchronism with the other driving gear, whereby when said arms rotate on their pivots one driving gear is moved out of phase with the other.

THOMAS H. RYAN.